May 2, 1961 M. G. SCOTT 2,982,378
WATER AND AIR COOLED BRAKE DRUM
Filed Sept. 12, 1958 3 Sheets-Sheet 1

INVENTOR.
MERL G. SCOTT
BY
ATTORNEYS

May 2, 1961    M. G. SCOTT    2,982,378
WATER AND AIR COOLED BRAKE DRUM
Filed Sept. 12, 1958    3 Sheets-Sheet 2

INVENTOR.
MERL G. SCOTT
BY
ATTORNEYS weeks# United States Patent Office 2,982,378
Patented May 2, 1961

2,982,378
WATER AND AIR COOLED BRAKE DRUM
Merl G. Scott, Pampa, Tex., assignor to Cabot Corporation, Boston, Mass., a corporation of Delaware
Filed Sept. 12, 1958, Ser. No. 760,628
1 Claim. (Cl. 188—264)

This invention relates generally to friction brakes and comprises more particularly an improved water and air cooling system for brake drums.

In the employment of winches of the usual construction serious problems have been encountered due to the heat generated by the friction between the brake lining and the brake drums thereof. Continuous operation of a winch demands an efficient braking system and one that will provide constant performance despite heavy load conditions. Overheating from steady use not only increases wearing of the brake lining and drums, but it also causes brake failures, a dangerous condition in any situation.

Many ideas have been developed in the past in an effort to solve this problem but none of the results so far have been entirely satisfactory. For instance, braking systems have been available in which the drum or wheel is provided with vanes to direct a flow of air to the vicinity of the braking surface. This arrangement is acceptable for drums rotating at a high rate of speed, but in the relatively slow turning drum used in draw-works, the air flow would be insufficient to achieve proper cooling.

Water has also been used as a cooling medium for brakes but heretofore the application of water has been generally random and inefficient. Therefore it is an object of the present invention to provide a combined water and air cooling system for brakes in draw-works and like applications.

Another object of this invention is to provide a water cooling system for brakes, of the type described, that is automatically operated in response to the temperature conditions at the brakes.

Still another object of this invention is to provide in brakes of the type described, brake rims that are easily detachable yet firmly mounted.

A feature of the present invention lies in a circumferential mixing chamber positioned adjacent the brake rim wherein air alone may pass or may combine with water to cool the brake rim.

Another feature of this invention is a temperature sensitive control system governing the flow of cooling water to the brake.

Figure 1:
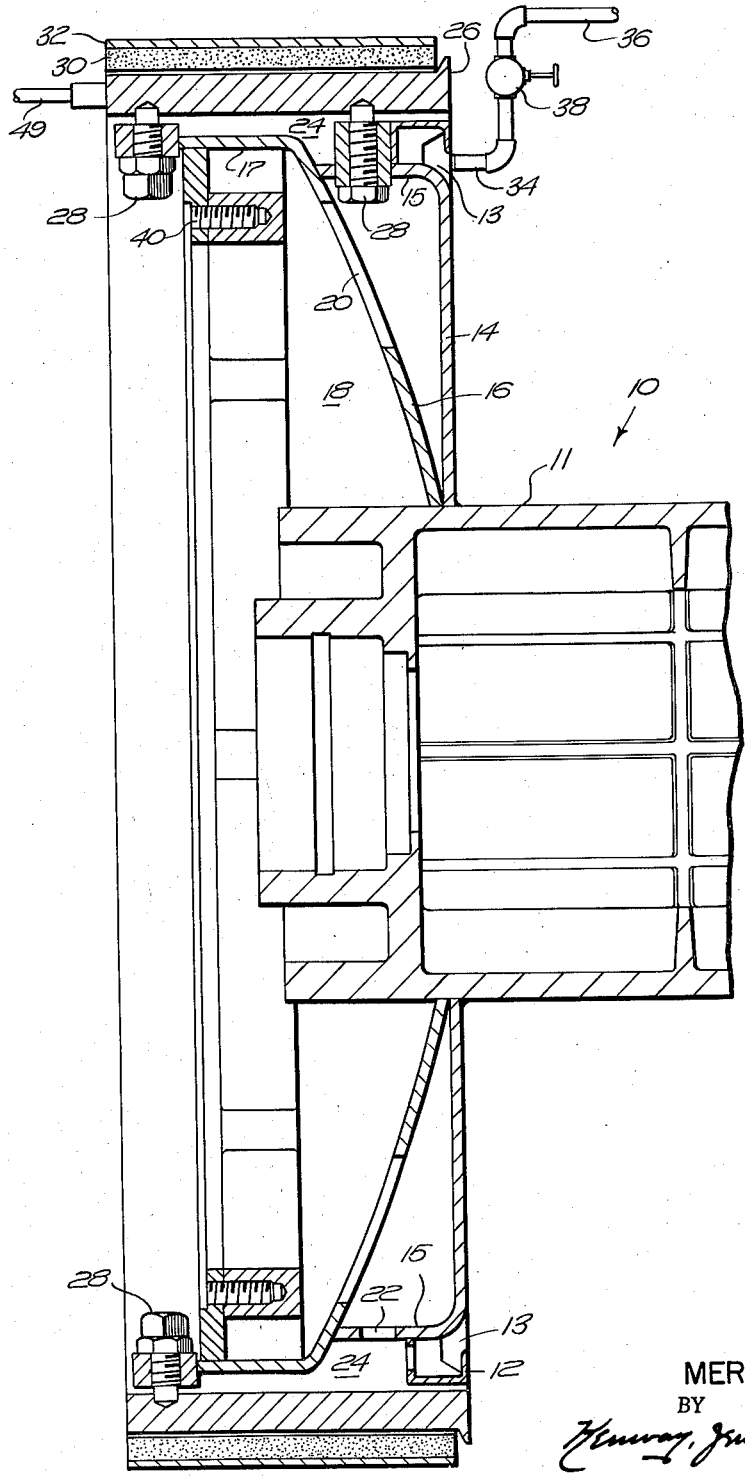
Figure 2:
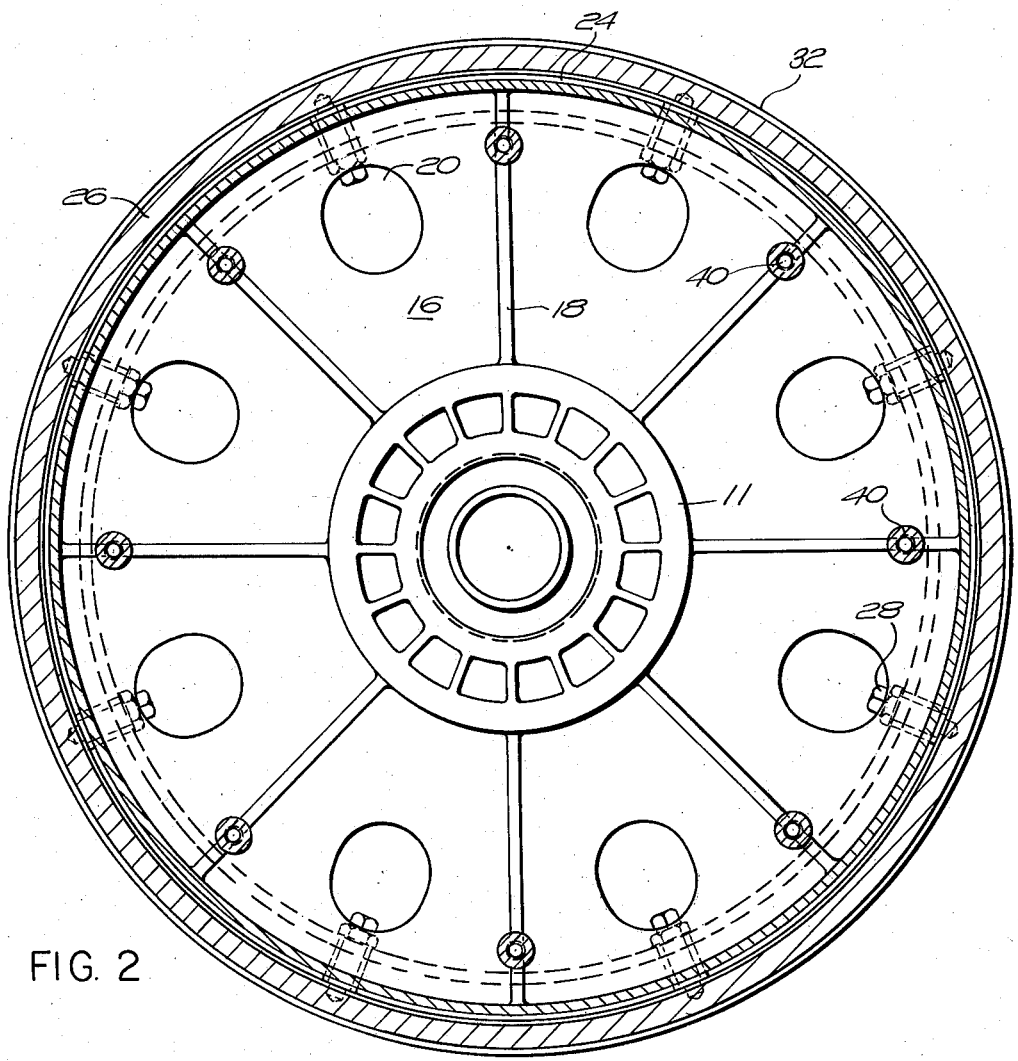
Figure 3:
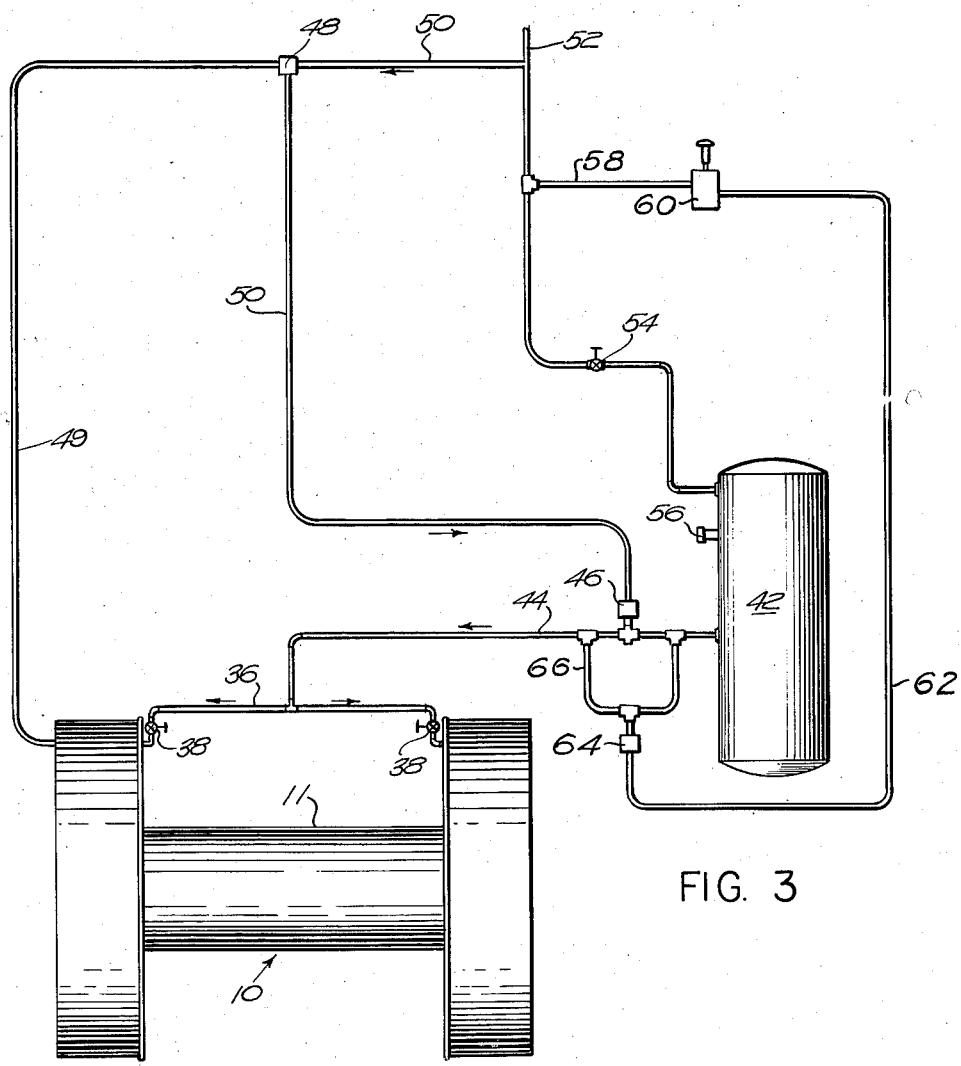

These and other features and objects of this invention will more readily appear from a detailed discussion of a preferred embodiment of the invention, selected for purposes of illustration and shown in the accompanying drawings, in which:

Fig. 1 is a vertical sectional view of the brake drum,
Fig. 2 is an end elevation of the drum structure,
Fig. 3 is a diagrammatic view showing the cooling water supply and control system for a brake drum.

In the drawings 10 represents a cable drum which is a generally hollow reinforced cylinder of typical construction and may be mounted for rotation about its longitudinal axis on suitable bearings (not shown). It is contemplated that the drum will be associated with the usual driving means, but since this forms no part of the invention only the coupling arrangement is shown herein.

The drum 10 is formed with a hub 11 to which are welded an outer web 14 and a smaller inner web 16, the webs converging inwardly to the periphery of the hub 11. Both webs are circular and support a brake rim 26 circumferentially mounted about the webs.

The outer web 14 is formed with a peripheral in-turned flange 15 welded at its edge to the inner web 16, and the outer web 14 merges into an in-turned flange 17 of substantially greater diameter than the flange 15. Running about the flange 15 of the outer web 14 between the flange 15 and the brake rim 26 is a water channel 13 formed by the flange and a channel member having boxed walls 12 forming a circumferentially complete water passage provided with front and rear openings for the passage of water.

It will be seen that the inner web 16 is somewhat dished in cross-section and formed with a plurality of evenly spaced, radially extending blades or vanes 18 which not only lend structural support to the web but also provides a blower feature whereby air may be drawn axially into the brake housing and forced radially through large ports 20 in the inner web 16 and also through ports 22 in the flange 15 to enter an air-water chamber 24 extending circumferentially between the flange 17 and the brake rim 26. Through the chamber 24 air alone may pass to cool the brake rim 26 during light load conditions, or water mixed with air may also be introduced during periods of heavy loads to provide additional cooling. The water may be conveniently injected through a nozzle 34 on a line 36, with a valve 38 provided for manual control of the flow. This water system will be described in greater detail hereinafter.

The brake rim 26 is mounted in a novel manner to provide ease of mounting and removal and also to space the rim from the web structure to permit passage of coolants. Two rings of evenly spaced set screws 28 are mounted in the web structure, one ring on the flange 17 and the other on the flange 15. Corresponding holes are drilled in the brake rim 26 to accommodate the ends of the set screws 28.

It will be obvious that by backing off these set screws 28 the brake rim 26 may be removed axially either for replacement or repair. Disposed circumferentially about the brake rim 26 for engagement therewith is a conventional brake lining 30 bonded or otherwise firmly secured to a brake band 32.

As another feature of the brake housing proper, a circular ring of tapped holes 40 are provided in bosses on the blades 18, to receive the screws or bolts from a coupling member of a driving mechanism.

Used in conjunction with the brake described above is a novel cooling water control and supply system shown diagrammatically in Fig. 3. This system is generally composed of a pressurized water reservoir 42 having a water discharge line 44 leading to the injection pipe 36, which in turn leads to the water channel 13 of the cable drum 10. A pair of cut-off valves 38 are provided on the injection pipe 36 and may be used manually to control the flow of cooling water to the brakes, however, normally this flow will be automatically controlled by an air actuated regulator 46 on the discharge line 44. A temperature-sensitive air control valve 48, interrupting an air line 50, actuates the regulator 46 and is itself governed by a control lead 49.

This control lead 49 connects the valve 48 to brake rim 26 and is sensitive to and transmits changes in temperature. Typical installations of this type utilize a mercury filled bulb at the sensitive area with a length of capillary tubing extending to the control fitting.

An air supply line 52 interrupted by a regulator 54 supplies air to the actuating line 50 and also maintains a constant pressure head in the reservoir 42. An air-tight cap 56 may be conveniently provided near the top of the reservoir 42 to permit replenishment of the reservoir should it become exhausted.

In summary then, the brake rims 26, during low friction operation, will be sufficiently cooled by the flow of air created by the rotating blades 18, but during periods of constant use and heavy load, when the brake rim temperatures would normally rise beyond a safe maximum, the water cooling system will be automatically actuated to supply water to the chamber 24 and to maintain the brake temperature within safe operating limits. The flow of water will be governed by the temperature in such a manner that whatever water is used will vaporize from the heat of the drum so that there will be no free water about the machinery. The flow is automatically cut off as soon the temperature is lowered sufficiently.

The water supply system includes a manually controlled circuit comprising a branch air line 58 running from the pipe 52 to a quick acting spring return valve 60 and thence through the pipe 62 and regulator 64 to a branch 66 that bypasses the automatically actuated regulator valve 46. It will be seen that by manually depressing the stem of the valve 60 air will be admitted through line 62 to air actuating valve 64 and water will be fed from the reservoir 42 through the bypass branch to the brake flanges whenever occasion demands.

While I have shown and described one embodiment of my invention in such a manner that the same may be readily understood by those skilled in the art, it is apparent that changes may be made in the details disclosed, without departing from the spirit of the invention as expressed in the claim.

What I claim and desire to secure by Letters Patent is:

A rotary brake assembly including a hub having inner and outer circular webs diverging outwardly from the hub to enclose an air space and being flanged at their outer edges, a circular brake rim supported by the flanges of the webs in spaced relation therefrom thereby forming a circumferential air chamber adjacent to and within the brake rim, radial vanes carried by the inner of said webs and acting to draw air into the rotary assembly, the inner web and the flange of the outer web having ports for directing cooling air to the said circumferential air chamber, and an annular channel member carried by the flange of the outer web, defining in part the said circumferential air chamber within the brake rim and providing a concentric passage for cooling water.

References Cited in the file of this patent

UNITED STATES PATENTS

| | | |
|---|---|---|
| 1,853,118 | Faulkner | Apr. 12, 1932 |
| 1,879,049 | Black | Sept. 27, 1932 |
| 1,966,823 | Miller | July 17, 1934 |
| 2,147,761 | Whitcomb | Feb. 21, 1939 |
| 2,263,961 | Wilson | Nov. 25, 1941 |
| 2,412,706 | Anderson | Dec. 17, 1946 |
| 2,436,758 | Middleton | Feb. 24, 1948 |
| 2,502,898 | Spitzer | Apr. 4, 1950 |

FOREIGN PATENTS

| | | |
|---|---|---|
| 707,273 | France | Apr. 13, 1931 |
| 739,244 | Great Britain | Oct. 26, 1955 |
| 297,407 | Italy | Mar. 3, 1931 |